United States Patent Office 2,901,356
Patented Aug. 25, 1959

2,901,356
METHOD OF PRESERVING ORANGE JUICE

Filippo Gallotti, Villalba, Italy

No Drawing. Application March 22, 1956
Serial No. 573,104

Claims priority, application Italy March 23, 1955

5 Claims. (Cl. 99—155)

The present invention relates to a method of preserving foods, and more particularly, it relates to a process of improving the storability of liquid foods derived from plants.

Methods of preserving foods by various means such as pasteurization, complete heat sterilization, or by other physical as well as chemical means have long been known. However, while it is thus possible to render foods sterile, the foods will remain in this condition only as long as they are enclosed in containers which prevent exposure of the sterilized or pasteurized foods to airborne or other bacterial infections. Furthermore, many of the sterilization methods employed in the preservation of foods cause a reduction in the original nutritional value of the foods, for instance by destroying a portion of the vitamins contained therein, and also deleteriously affect the taste characteristics of the thus-treated foods. The use of chemical preserving agents is also restricted by governmental regulations in many countries, especially if those chemical agents are retained in the food product, while the initial use of chemical agents during the manufacturing process, which agents such as sulfur dioxide are eliminated prior to completion of the processing, will not prevent later spoilage of the food product if the same is exposed to sources of bacterial infection.

It is therefore an object of the present invention to overcome the disadvantages and difficulties experienced in the use of conventional preservation methods.

It is a further object of the present invention to provide a method whereby liquid foods, and especially liquid foods of vegetabilic origin, once sterilized, will be rendered immune against subsequent bacterial infection.

It is another object of the present invention to provide a method whereby liquid foods can be permanently protected against spoilage in a simple and economical manner.

Other objects and advantages of the present invention will become apparent from a further reading of the description and the appended claims.

With the above objects in view the present invention mainly consists in a process of improving the storability of liquid foods derived from plants, comprising the steps of reducing the water content of a liquid food by at least 50% while maintaining the liquid condition of the food, so as to concentrate the liquid food, adjusting the temperature of the thus-concentrated liquid food to between 18° C. and 25° C., subsequently lowering the temperature of the concentrated liquid food in a plurality of separate cooling stages to a maximum temperature of −1° C., each of said separate cooling stages being so adjusted as to reduce the temperature of the concentrated liquid food by between about 1° C. and 5° C. during a time period not exceeding approximately 1 minute, the concentrated liquid food being maintained at the temperature to which it has been reduced during any of the cooling stages for a time period of at least one hour prior to being subjected to further cooling in the next subsequent cooling stage, and subsequently increasing the temperature of the thus-cooled concentrated liquid food in a plurality of separate heating stages to a temperature of about 20° C., each of the separate heating stages being so adjusted as to increase the temperature of the concentrated liquid food by between about 1° C. and 5° C. during a time period not exceeding approximately 1 minute, the concentrated liquid food being maintained at the temperature to which it has been heated during any of the heating stages for a time period of at least 1 hour prior to being subjected to further heating in the next subsequent heating stage, whereby a concentrated liquid food product having increased resistance against spoilage is obtained.

A liquid food preserved according to the method of the present invention and having been initially sterilized, will remain in preserved condition even when packed in containers which are not hermetically closed and such food may be removed from its container in individual portions without jeopardizing the preserved state of the food remaining in the container.

According to a preferred embodiment of the present invention, the initial sterilization of the food is accomplished by means of ozone. Liquid vegetabilic foods can be sterilized with ozone without losing any of their nutritional values and without any change in the taste or smell of the food. Similarly the process of the present invention as described above will not affect taste, smell and nutritional value of the treated food, and consequently the final product obtained will retain the full flavor of the original food as well as all of its nutritional constituents.

The surprising improvement in the storability of the liquid food is accomplished according to the present invention by first quickly reducing the temperature of the suitably concentrated liquid food product from a starting temperature of between 18° C. and 25° C. to a temperature between 1° C. and 5° C. lower than the starting temperature. The reduction in the temperature of the food product is to be accomplished as quickly as possible, and should not require more than one minute. This process of cooling the food product is then repeated until a temperature not higher than −1° C. is reached. Each of the cooling steps is to be completed within one minute or less, and between subsequent cooling steps, the food product is maintained at the previously reached lower temperature for a time period of between 1 and 2 hours. Preferably the temperature of the food product is reduced from an initial temperature of approximately 20° C. in individual cooling stages by 5° C. each until the food product has been cooled to a temperature of between 1° C. and 8° C. Thereafter the cooling to a temperature not higher than −1° C. is accomplished in individual cooling stages in each of which the temperature of the food product is reduced by approximately 1° C. Preferably each cooling stage in which the temperature is lowered by 5° C. is followed by a rest period of about 2 hours during which the temperature of the food product is maintained at the last reached level, and each cooling stage in which the temperature is lowered by 1° C. is followed by a rest period of about 1 hour prior to again changing the temperature of the food product.

Without limiting the present invention to any specific interpretation of what causes the surprising results of the above described intermittent cooling treatment, it seems that the cooling by a plurality of individual, quick, sock-like stages with interspersed resting periods changes the characteristics of constituents of the concentrated liquid fruit juice, vegetable juice or the like so as to make the same substantially immune against airborne or other bacterial infection or the deleterious influence of other micro organisms.

Attainment of the above results is facilitated by a preceding sterilization of the concentrated liquid food product, which preliminary sterilization may be carried out by any of the conventional means known for this purpose, such as pasteurization, ultraviolet irradiation, the recently developed gamma ray treatment and the like. However, preliminary sterilization with ozone has been proven to be particularly advantageous according to the present invention. Due to the immediacy of its action and effect, ozone permits complete preservation of the nutritional and organoleptic properties of the treated product. However, it is essential to remove ozone and any free oxygen formed during ozonization of the food product from the same immediately after completion of the ozone treatment. The ozonization as well as the subsequent degassing of the food product may be accomplished by conventional means well known in the art. Preferably approximately 1 liter of ozonized air is applied for each kilogram of food product to be treated, and the ozone-containing air is allowed to remain in contact with the food product for about 1 minute. During the degassing of the ozonized food product the temperature of the same can be simultaneously adjusted to between 18° C. and 25° C., preferably about 20° C., in preparation of the now following stage-wise cooling of the food product.

After the desired minimum temperature of the food product, of not higher than −1° C. has been reached according to the multi-stage cooling process described above, the food product is heated again to room temperature in a multi-stage heating process similar to but in reverse direction of the multi-stage cooling process. The cold food product is first heated by about 1° C. in individual heating stages, each heating stage being followed by a period of about 1 hour during which the food product is maintained at the last reached temperature. Preferably after a temperature of between 1° C. and 8° C. has been reached, the subsequent heating stages will be so adjusted that in each of the same the temperature of the food product is increased by about 5° C. and the resting period between 2 heating stages is increased to about 2 hours.

The liquid food product as obtained from plants is to be concentrated by conventional methods well known in the art such as vacuum concentration so as to reduce the water content thereof by at least 50%, preferably by between 50% and 75%, and most preferably by between 50% and 60%.

Thus, according to a preferred embodiment, the present invention consists of a process of improving the storability of liquid foods derived from plants, comprising the steps of reducing the water content of a liquid food by between 50% and 60% while maintaining the liquid condition of the food, so as to concentrate the liquid food, treating the thus-concentrated liquid food with a gas containing ozone so as to substantially sterilize the concentrated liquid food, removing ozone from the thus-treated concentrated liquid food, thereafter adjusting the temperature of the concentrated liquid food to approximately 20° C., subsequently lowering the temperature of the concentrated liquid food in a plurality of separate primary cooling stages to a temperature of between 1° C. and 8° C., each of the separate primary cooling stages being so adjusted as to reduce the temperature of the concentrated liquid food by approximately 5° C. during a time period not exceeding approximately one minute, the concentrated liquid food being maintained at the temperature to which it has been reduced during any of the primary cooling stages for a time period of approximately two hours prior to being subjected to further cooling in the next subsequent primary cooling stage, subsequently lowering the temperature of the concentrated liquid food in a plurality of separate secondary cooling stages from said temperature of between 1° C. and 8° C. to a maximum temperature of −1° C., each of the separate secondary cooling stages being so adjusted as to reduce the temperature of the concentrated liquid food by approximately 1° C. during a time period not exceeding approximately one minute, the concentrated liquid food being maintained at the temperature to which it has been reduced during any of the secondary cooling stages for a time period of approximately one hour prior to being subjected to further cooling in the next subsequent primary cooling stage, and subsequently increasing the temperature of the thus-cooled concentrated liquid food in a plurality of primary and secondary separate heating stages to a temperature of about 20° C., each of the separate primary heating stages being so adjusted as to increase the temperature of the concentrated liquid food by approximately 1° C. during a time period not exceeding approximately 1 minute, the concentrated liquid food being maintained at the temperature to which it has been heated during any of the primary heating stages for a time period of at least 1 hour prior to being subjected to further heating in the next subsequent primary heating stage, the secondary heating stages immediately following the primary heating stages and being so adjusted as to increase the temperature of the concentrated liquid food by approximately 5° C. during a time period not exceeding approximately one minute, the concentrated liquid food being maintained at the temperature to which it has been increased during any of the secondary heating stages for a time period of approximately two hours prior to being subjected to further heating in the next subsequent secondary heating stage, whereby a concentrated liquid food product having increased resistance against spoilage is obtained.

While according to the present invention the original water content of the liquid vegetabilic food product is reduced by at least 50%, and most preferably by between 60% and 75%, it must be noted that the actual percentage amount of water which is to be removed from the natural juice depends on the type of juice and on the specific water content thereof. Thus, if the original water content of the juice is relatively high, or if a strongly concentrated final product is desired, a greater percentage of the originally present water is to be removed. In any event, however, not less than 50% of the original water content are removed, and the remaining water content must be great enough to maintain the finished product in liquid state.

The following examples are given as illustrative only, the present invention however not being limited to the specific details of the examples.

EXAMPLE I

*Juice of agriots, cherries and mahaleb-cherries*

The stones are removed from the fruits and the juice is obtained by squeezing the de-stoned fruits in an Archimedean screw press. The thus-obtained juice is concentrated under vacuum and at a temperature not higher than 35° C. until the volume has been reduced to about one third of the volume of the freshly pressed juice.

The concentrated juice is ozonized for about 1 minute, using about 1 liter of ozonized air per 1 liter of concentrated juice. Immediately thereafter the juice is degassed in order to completely remove ozone and free oxygen therefrom, and is simultaneously heated to about 23° C. The juice is then quickly cooled to 18° C. The 5° C. reduction in temperature is accomplished within 1 minute. Thereafter, the temperature of the juice is maintained at 18° C. for 2 hours, then the juice is again cooled by 5° C. in 1 minute and maintained at the thus-reached temperature for 2 hours. Cooling by 5° C. in 1 minute and subsequent resting at the thus-reached temperature is repeated until the temperature of the juice has been reduced to 3° C. In 4 additional cooling stages the temperature is further reduced by 1°

C. each to a final temperature of −1° C. and again between two successive cooling stages, the juice is allowed to rest at the last reached temperature, however, for 1 hour only. After maintaining the juice at a temperature of −1° C. for 1 hour, the same is heated in 5 individual heating stages by 1° C. each until it reaches a temperature of 3° C., thereafter by individual heating stages of 5° C. each until the initial temperature of 23° C. has been reached. Again, between individual heating stages of 1° C. the juice is maintained for 1 hour at the last reached temperature, and between individual heating stages of 5° C. the juice is maintained for 2 hours at the last reached temperature.

The thus-treated juice may be homogenized, or the clear juice may be separated from the pulp. In either case, the juice will not be fermented or otherwise spoiled even upon prolonged exposure to air at normal temperatures.

EXAMPLE II

*Juice of oranges, lemons, grapefruits, mandarins, sour oranges* (Citrus bigaradia), *citrons*

The juice is obtained in a juice extractor commonly used for citrus fruits, in which the entire fruit is first cut in half and then separated into cup-shaped peels, the utricles, and juice. The juice is then filtered and concentrated as described in Example I. Thereafter, the utricles and a small portion of the peels (about 1 kilogram for 100 kilograms of concentrated juice) are being ground to a very fine pulp and the pulp is then emulsified with three times its own weight of heavy sugar syrup. The thus-obtained emulsion is then thoroughly mixed with the concentrated juice, and the product thereby obtained is then further treated by ozonization, degassing, cooling and heating as described in Example I.

EXAMPLE III

*Juice of tomatoes*

The freshly pressed juice of tomatoes is treated substantially as described in Example I. However, the cooling is started from an initial temperature of 25° C. During the first five cooling stages the temperature of the concentrated juice is reduced by slightly less than 5° C. each to 1° C., thereafter in three subsequent cooling stages the temperature is reduced by 1° C. each to a final low temperature of −2° C.

EXAMPLE IV

*Juice of apricots, peaches, plums, apples, pears*

The juices are produced from fruits from which stones, seeds and peels have been previously removed. A juice extractor equipped for the automatic straining out of pulp is employed. The thus-obtained juice is concentrated and further treated as described in Example I.

EXAMPLE V

*Stabilized juices which have been previously treated with sulfur dioxide*

Juices which have previously been treated with sulfur dioxide can also be stabilized according to the process of the present invention substantially as described in Example I, after sulfur dioxide has been removed therefrom.

EXAMPLE VI

*Grape juice*

A must is prepared from fresh grapes, filtered and concentrated under high vacuum to a sugar concentration of between 20° and 25° Bé. Further treatment of the concentrated juice is according to the procedure described in Example I, except that the first cooling stage starting from an initial temperature of 25° C. will reduce the temperature by 10° C., and the juice is maintained at the thus reached temperature of 15° C. for four hours prior to the subsequent cooling stage in which the temperature is reduced by 5° C.

EXAMPLE VII

*Celery juice*

The fresh juice is obtained by means of a screw-type press, and is concentrated to about one sixth of its original volume. The concentrated juice is treated as described in Example I. Thereafter the juice is allowed to stand until the pulp has settled on the bottom, and the clear supernatant juice is then separated from the pulp layer.

Any of the juices prepared according to the foregoing examples may either be completely separated from pulp particles, or, all or part of the pulp may be embodied in the stabilized juice by a homogenizing process subsequent to the stabilizing processes according to the present invention described in the foregoing examples.

In either case, whether clear or pulp-containing, the juice treated according to the present invention will remain stable and not be subject to spoilage or fermentation even when exposed to air for prolonged time periods.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of improving the storability of orange juice, comprising the steps of reducing the water content of said orange juice by at least 50% while maintaining a maximum temperature of 35° C. and also maintaining the liquid condition of said orange juice, so as to concentrate said orange juice; treating the thus concentrated orange juice with a gas containing ozone so as to substantially sterilize said orange juice; removing ozone from the thus-treated concentrated orange juice, thereafter adjusting the temperature of the concentrated orange juice to between 18° C. and 25° C.; subsequently lowering the temperature of said concentrated orange juice in a plurality of separate primary cooling stages to a maximum temperature of between 1° C. and 8° C., each of said separate primary cooling stages being so adjusted as to reduce the temperature of said concentrated orange juice by approximately 5° C. during a time period not exceeding approximately 1 minute, said concentrated orange juice being maintained at the temperature to which it has been reduced during any of said primary cooling stages for a time period of approximately two hours prior to being subjected to further cooling in the next subsequent primary cooling stage; subsequently lowering the temperature of said concentrated orange juice in a plurality of secondary cooling stages from said temperature of between 1° C. and 8° C. to a maximum temperature of −1° C., each of said secondary cooling stages being so adjusted as to reduce the temperature of said concentrated orange juice by approximately 1° C. during a time period not exceeding approximately one minute, said concentrated orange juice being maintained at the temperature to which it has been reduced during any of said secondary cooling stages for a time period of approximately one hour prior to being subjected to further cooling in the next subsequent secondary cooling stage; and subsequently increasing the temperature of the thus-cooled concentrated orange juice in a plurality of separate heating stages to a temperature of about 20° C., each of said separate heating stages being so adjusted as to increase the temperature of said concentrated orange juice by between about 1° C. and 5° C. during a time period not exceeding approximately 1 minute, said concentrated orange juice being maintained at the temperature to which it has been heated during any of said heating stages for a time period of at least 1 hour prior to being subjected to further heating in the next subsequent heating stage, whereby a concentrated orange juice having increased resistance against spoilage is obtained.

2. A process of improving the storability of orange juice, comprising the steps of reducing the water content of said orange juice by at least 50% while maintaining a maximum temperature of 35° C. and also maintaining the liquid condition of said orange juice, so as to concentrate said orange juice; treating the thus concentrated orange juice with a gas containing ozone so as to substantially sterilize said orange juice; removing ozone from the thus-treated concentrated orange juice, thereafter adjusting the temperature of the thus-concentrated orange juice to between 18° C. and 25° C.; subsequently lowering the temperature of said concentrated orange juice in a plurality of separate cooling stages to a maximum temperature of −1° C., each of said separate cooling stages being so adjusted as to reduce the temperature of said concentrated orange juice by between about 1° C. and 5° C. during a time period not exceeding approximately 1 minute, said concentrated orange juice being maintained at the temperature to which it has been reduced during any of said cooling stages for a time period of at least one hour prior to being subjected to further cooling in the next subsequent cooling stage; and subsequently increasing the temperature of the thus-cooled concentrated orange juice in a plurality of primary separate heating stages to a temperature of about between 1° C. and 8° C., each of said separate primary heating stages being so adjusted as to increase the temperature of said concentrated orange juice by approximately 1° C. during a time period not exceeding approximately 1 minute, said concentrated orange juice being maintained at the temperature to which it has been heated during any of said primary heating stages for a time period of at least 1 hour prior to being subjected to further heating in the next subsequent primary heating stage; subsequently increasing the temperature of said concentrated orange juice in a plurality of secondary heating stages from said temperature of between 1° C. and 8° C. to a temperature of about 20° C., each of said secondary heating stages being so adjusted as to increase the temperature of said concentrated orange juice by approximately 5° C. during a time period not exceeding approximately one minute, said concentrated orange juice being maintained at the temperature to which it has been increased during any of said secondary heating stages for a time period of approximately two hours prior to being subjected to further heating in the next subsequent secondary heating stage, whereby a concentrated orange juice having increased resistance against spoilage is obtained.

3. A process of improving the storability of orange juice, comprising the steps of reducing the water content of said orange juice by at least 50% while maintaining a maximum temperature of 35° C. and also maintaining the liquid condition of said orange juice, so as to concentrate said orange juice; treating the thus concentrated orange juice with a gas containing ozone so as to substantially sterilize said orange juice; removing ozone from the thus-treated concentrated orange juice, thereafter adjusting the temperature of the thus-concentrated orange juice to between 18° C. and 25° C.; subsequently lowering the temperature of said concentrated orange juice in a plurality of separate primary cooling stages to a maximum temperature of between 1° C. and 8° C., each of said separate primary cooling stages being so adjusted as to reduce the temperature of said concentrated orange juice by approximately 5° C. during a time period not exceeding approximately 1 minute, said concentrated orange juice being maintained at the temperature to which it has been reduced during any of said primary cooling stages for a time period of approximately two hours prior to being subjected to further cooling in the next subsequent primary cooling stage; subsequently lowering the temperature of said concentrated orange juice in a plurality of secondary cooling stages from said temperature of between 1° C. and 8° C. to a maximum temperature of −1° C., each of said secondary cooling stages being so adjusted as to reduce the temperature of said concentrated orange juice by approximately 1° C. during a time period not exceeding approximately one minute, said concentrated orange juice being maintained at the temperature to which it has been reduced during any of said secondary cooling stages for a time period of approximately one hour prior to being subjected to further cooling in the next subsequent secondary cooling stage; and subsequently increasing the temperature of the thus-cooled concentrated orange juice in a plurality of primary separate heating stages to a temperature of about between 1° C. and 8° C., each of said separate primary heating stages being so adjusted as to increase the temperature of said concentrated orange juice by approximately 1° C. during a time period not exceeding approximately 1 minute, said concentrated orange juice being maintained at the temperature to which it has been heated during any of said primary heating stages for a time period of at least 1 hour prior to being subjected to further heating in the next subsequent primary heating stage; subsequently increasing the temperature of said concentrated orange juice in a plurality of secondary heating stages from said temperature of between 1° C. and 8° C. to a temperature of about 20° C., each of said secondary heating stages being so adjusted as to increase the temperature of said concentrated orange juice by approximately 5° C. during a time period not exceeding approximately one minute, said concentrated orange juice being maintained at the temperature to which it has been increased during any of said secondary heating stages for a time period of approximately two hours prior to being subjected to further heating in the next subsequent secondary heating stage, whereby a concentrated orange juice having increased resistance against spoilage is obtained.

4. A process of improving the storability of orange juice, comprising the steps of reducing the water content of said orange juice by at least 50% while maintaining a maximum temperature of 35° C. and also maintaining the liquid condition of said orange juice, so as to concentrate said orange juice; treating the thus concentrated orange juice with a gas containing ozone so as to substantially sterilize said orange juice; removing ozone from the thus-treated concentrated orange juice, thereafter adjusting the temperature of the concentrated orange juice to between 18° C. and 25° C.; subsequently lowering the temperature of said concentrated orange juice in a plurality of separate cooling stages to a maximum temperature of −1° C., each of said separate cooling stages being so adjusted as to reduce the temperature of said concentrated orange juice by between about 1° C. and 5° C. during a time period not exceeding approximately 1 minute, said concentrated orange juice being maintained at the temperature to which it has been reduced during any of said cooling stages for a time period of at least one hour prior to being subjected to further cooling in the next subsequent cooling stage; and subsequently increasing the temperature of the thus-cooled concentrated orange juice in a plurality of separate heating stages to a temperature of about 20° C., each of said separate heating stages being so adjusted as to increase the temperature of said concentrated orange juice by between about 1° C. and 5° C. during a time period not exceeding approximately 1 minute, said concentrated orange juice being maintained at the temperature to which it has been heated during any of said heating stages for a time period of at least 1 hour prior to being subjected to further heating in the next subsequent heating stage, whereby a concentrated orange juice having increased resistance against spoilage is obtained.

5. A process of improving the storability of orange juice, comprising the steps of reducing the water content of said orange juice by between 50% and 60% while maintaining a maximum temperature of 35° C. and also maintaining the liquid condition of said orange juice, so as to concentrate said orange juice; treating the thus-concentrated orange juice with a gas containing ozone as sterilized ingredient so as to substantially sterilize said concentrated orange juice; removing ozone from the thus-treated concentrated orange juice; thereafter adjusting the temperature of said concentrated orange juice to approximately 20° C.; subsequently lowering the temperature of said concentrated orange juice in a plurality of separate primary cooling stages to a temperature of between 1° C. and 8° C., each of said separate primary cooling stages being so adjusted as to reduce the temperature of said concentrated orange juice by approximately 5° C. during a time period not exceeding approximately one minute, said concentrated orange juice being maintained at the temperature to which it has been reduced during any of said primary cooling stages for a time period of approximately two hours prior to being subjected to further cooling in the next subsequent primary cooling stage; subsequently lowering the temperature of said concentrated orange juice in a plurality of separate secondary cooling stages from said temperature of between 1° C. and 8° C. to a maximum temperature of −1° C., each of said separate secondary cooling stages being so adjusted as to reduce the temperature of said concentrated orange juice by approximately 1° C. during a time period not exceeding approximately one minute, said concentrated orange juice being maintained at the temperature to which it has been reduced during any of said secondary cooling stages for a time period of approximately one hour prior to being subjected to further cooling in the next subsequent primary cooling stage; and subsequently increasing the temperature of the thus-cooled concentrated orange juice in a plurality of primary separate heating stages to a temperature of about between 1° C. and 8° C., each of said separate primary heating stages being so adjusted as to increase the temperature of said concentrated orange juice by approximately 1° C. during a time period not exceeding approximately 1 minute, said concentrated orange juice being maintained at the temperature to which it has been heated during any of said primary heating stages for a time period of at least 1 hour prior to being subjected to further heating in the next subsequent primary heating stage; subsequently increasing the temperature of said concentrated orange juice in a plurality of secondary heating stages from said temperature of between 1° C. and 8° C. to a temperature of about 20° C., each of said secondary heating stages being so adjusted as to increase the temperature of said concentrated orange juice by approximately 5° C. during a time period not exceeding approximately one minute, said concentrated orange juice being maintained at the temperature to which it has been increased during any of said secondary heating stages for a time period of approximately two hours prior to being subjected to further heating in the next subsequent secondary heating stage, whereby a concentrated orange juice having increased resistance against spoilage is obtained.

References Cited in the file of this patent

UNITED STATES PATENTS

| | | |
|---|---|---|
| 1,126,430 | Elliott | Jan. 26, 1915 |
| 2,573,699 | Eskew et al. | Nov. 6, 1951 |